Figure 1:
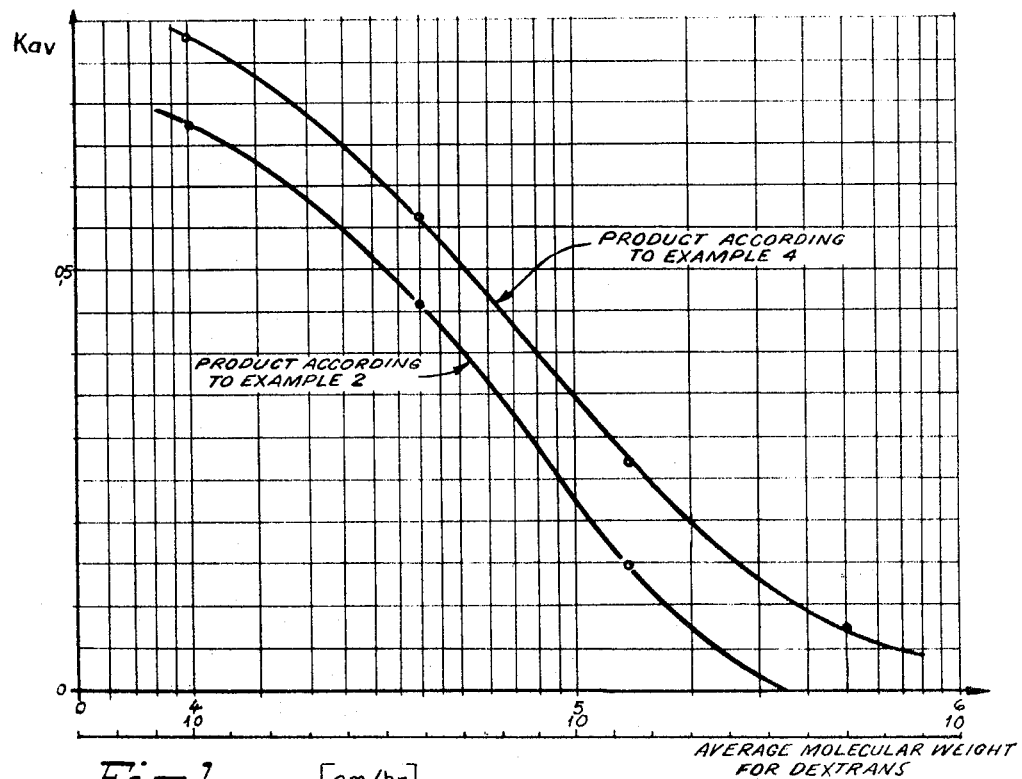

United States Patent

[11] 3,598,245

| [72] | Inventors | Helmut Determann<br>Frankfurt am Main;<br>Theodor Wieland, Mainz, both of,<br>Germany |
|---|---|---|
| [21] | Appl. No. | 869,795 |
| [22] | Filed | Oct. 27, 1969 |
| [45] | Patented | Aug. 10, 1971 |
| [73] | Assignee | Pharmacia Fine Chemicals A B<br>Uppsala, Sweden |
| [32] | Priority | Oct. 30, 1968 |
| [33] | | Sweden |
| [31] | | 14668/68 |

[54] SEPARATION MEDIUM FOR GEL FILTRATION AND A METHOD FOR ITS PREPARATION
10 Claims, 2 Drawing Figs.

[52] U.S. Cl.......................................... 210/500, 210/31
[51] Int. Cl........................................... B01d 15/08
[50] Field of Search............................. 210/31 C, 198 C, 500, 502; 55/67, 197, 386

[56] References Cited
UNITED STATES PATENTS

| 3,002,823 | 10/1961 | Flodin et al. | 210/31 C |
| 3,252,270 | 5/1966 | Pall et al. | 210/502 UX |
| 3,441,142 | 4/1969 | Oja | 210/500 |

Primary Examiner—J. L. DeCesare
Attorney—Fred C. Philpitt

ABSTRACT: A separation medium for gel filtration having an exclusion limit within the molecular weight range of from 10,000 to 10 million consisting of grains of certain water-insoluble copolymers reinforced with a rigid hydrophilic macroporous material, and method for the preparation thereof. The rigid hydrophilic macroporous material can be grains of regenerated cellulose having a bulk density of 2—25 g./dl., and a pore size in the range of from 2 to 2,000 $\mu$.

SEPARATION MEDIUM FOR GEL FILTRATION AND A METHOD FOR ITS PREPARATION

The present invention relates to a separation medium for gel filtration consisting of grains of a water-insoluble copolymer of a hydroxyl-group-containing substance with a bifunctional substance of the formula X-R-Z, wherein X and Z are each halogen or an epoxy group and R is an aliphatic group containing 3—10 carbon atoms, the separation medium having an exclusion limit for globular proteins, viruses and the like in the molecular weight range of from 10,000 to 10 million; preferably from 50,000 to 2 million.

A separation medium of this type is known to the art (see U.S. Pat. Nos. 3,002,823 and 3,105,012). In the former patent specification the hydroxyl-group-containing substance is dextran or fractions of dextran of different average molecular weights, while the latter patent specification envisages such substances as dextrin, starch, cellulose derivative, polyvinyl alcohol etc. The bifunctional substances are in particular epichlorohydrin, or alternatively other such substances in which the group R contains a large number of carbon atoms can be used. Such separation media can be used technically if they have an exclusion limit of up to 10,000—50,000. Difficulties are encountered above this value, in that the extent to which the gel grains can be deformed is excessive. This is reflected in their poor flow properties when arranged in the form of a bed. The poor flow properties of the bed are, in turn, the result of the grains, because of their deformability, being pressed together by the fall in pressure over the bed, whereupon the resistance to flow increases. This characteristic restricts the use of the separation media purely technically, while disadvantages are encountered for such a separation media which can be used technically, as a result of the impaired flow.

It has now been discovered that the aforementioned disadvantages can be avoided or essentially reduced if the grains in the aforementioned separation medium are reinforced with a rigid, hydrophilic, macroporous material.

In accordance with the aforegoing, particular advantages are obtained if the copolymer is given an exclusion limit for globular proteins, viruses or the like in the molecular weight range of from approximately 50,000 to approximately 2 million.

In accordance with the invention the rigid, hydrophilic, macroporous material may be grains of regenerated cellulose, the bulk density of which being 2—25 g./dl. and the cellulose grains having a pore size of substantially in the range of from 2 to 2,000 $\mu$.

Rigid, hydrophilic, macroporous materials of the type used for reinforcing the grains of the separation medium in accordance with the invention are previously known. The described regenerated cellulose material is described in our prior copending U.S. Pat. application Ser. No. 750,003, filed Aug. 5, 1968, and now abandoned, to which reference is made wherever applicable. In the last-mentioned patent application, however, the macroporous, granular material is itself used as a separation medium. It can be used for separating substances mixtures of very high molecular weight, e.g. mixtures of viruses. It is not possible to deduce from the patent specification that the material is also able to serve as a reinforcing material or supporting substance for the known separation media of much lower exclusion limit. The present invention thus concerns a novel use of the rigid, macroporous materials.

The separation medium of the present invention is characterized in the aforegoing by the exclusion limit. This can be determined by packing the products of the invention into beds and chromatographing a series of homologous substances of different average molecular weights on said bed. The degree of penetration, $K_{nr}$, can then be calculated for the respective homologues. $K_{nr}$ is defined by the equation $K_{nr} = (V_e - V_o)/(V_t - V_o)$ wherein $V_e$ is the elution volume for the homologue in question, $V_t$ is the volume of the bed and $V_o$ the void volume of the bed. $V_o$ is determined as $V_e$ for a substance which cannot penetrate the grains, e.g. bacteria. FIG. 1 of the appending drawing shows $K_{nr}$ versus average molecular weight for dextrans, used as homologous substances, chromatographed on the products prepared according to example 4 (upper curve) and example 2 (lower curve) of the following examples. The exclusion limit, i.e. the molecular size limit up to which the product in question can fractionate in accordance with molecular size, is obtained at the point where the curve intersects the abscissa, and is given in the following example to characterize the different products. It has been discovered that is globular proteins are used as homologous substances an approximately twice as large exclusion limit is obtained. In order that a separation medium can be used for separating substance mixtures, at least one of the substances in the mixture should have a molecular size which lies beneath the exclusion limit. Every separation medium has a suitable fractionating area which lies under the exclusion limit. In order that the substances of a substance mixture can be fractionated at all it is necessary that at least one of the substances has a molecular size within the fractionating area.

The invention is also concerned with a process for preparing the aforementioned separation medium. In accordance with the invention it is possible to these ends to copolymerize in the pores of a rigid, hydrophilic, macroporous granular material a hydroxyl-group-containing substance with the assistance of a bifunctional substance of the formula X-R-Z, where X and Z are each halogen or an epoxy group and R is an aliphatic group containing 3—10 carbon atoms in an aqueous solution, the proportions of the hydroxyl-group-containing substance and bifunctional substance in aqueous solution and the molar ratio between these substances being so selected that the resulting copolymer is insoluble in water and obtains an exclusion limit for globular proteins, viruses or the like within the molecular weight range of from 10,000 to 10 million, preferably within the range of from 50,000 to 2 million.

With regard to the content of the hydroxyl-group-containing substance, this must be adjusted to a value lower than is the case when unreinforced separation media are prepared (see the previously mentioned U.S. Pat. specifications), since in the latter case there is nothing to prevent the medium from swelling to equilibrium upon completion of the copolymerization process, while in the present case the medium is not able to swell, since it is enclosed in the reinforced material. Suitable contents lie mainly in the range 2—20 g./dl., preferably 4—12g./dl. The quantity of bifunctional substances is adjusted to a value which exceeds that necessary to obtain the so-called gel point. This can be studied in model tests in which the reinforcing material is not present, it being easy to discern when the gel point is obtained. The content depends on both the content and the molecular weight of the hydroxyl-group-containing substance, and will vary substantially between the limits 3 and 40 percent (of the quantity of solution of hydroxyl-group-containing substance). Examples of suitable hydroxyl-group-containing substances and bifunctional substances are recited in the mentioned U.S. Pat. specifications.

In accordance with another embodiment of the invention, the rigid, hydrophilic, macroporous, granular material is in the form of grains of regenerated cellulose having the bulk density 2—25 g./dl. (grams of cellulose based on the weight of the volume of the grains), the cellulose having a pore size substantially between 2 and 2,000 $\mu$.

Figure 2:
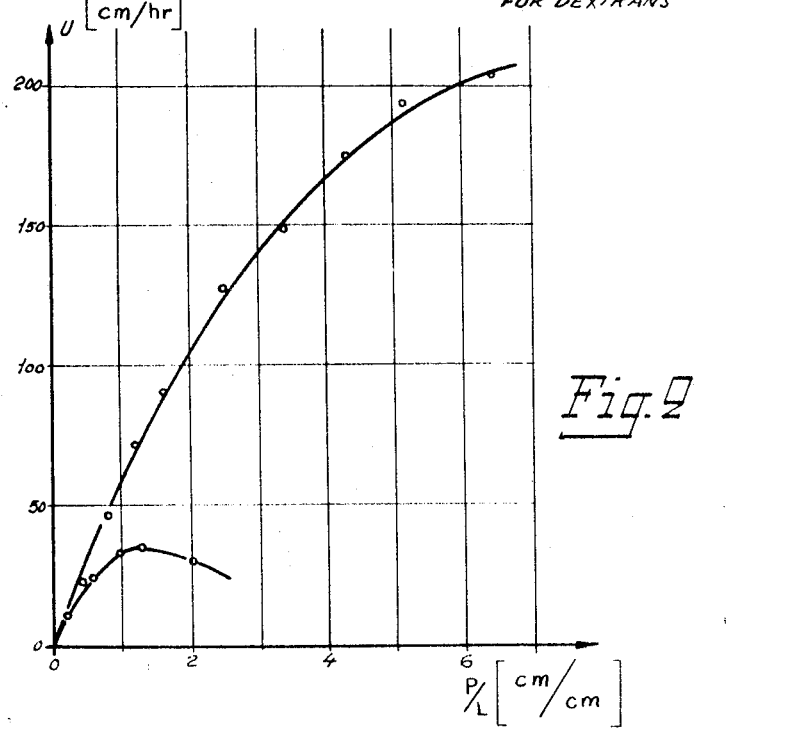

The invention will now be illustrated with reference to a number of examples and with reference to the drawing wherein FIG. 1 illustrates $K_{AV}$ versus average molecular weight for dextrans chromatographed on products prepared according to the invention, and FIG. 2 illustrates a flow test of reinforced and nonreinforced products.

EXAMPLE 1

Twelve grams of cellulose powder (type "Munktell 400" from Grycksbo AB, Sweden, were dissolved in a solution of 7.2 g. copper-II-hydroxide and 0.75 g. copper-I-chloride in 300 ml. of concentrated ammonium hydroxide solution. The solution of cellulose was emulsified in 400 ml. of toluene, 8 g. of a reaction product between Castor oil fatty acids and ethylene oxide (type "Cremophol EL" from Badische Anilin- und Sodafabrik, Western Germany) being dissolved as an emulsifier. Subsequent to stirring for 10 minutes with an impeller type agitator at a speed of 500 revolutions per minute the emulsion was poured out in the form of a jet, down into a well stirred regenerating bath consisting of a solution comprising 750 g. of benzoic acid in 9 l. of toluene. Ten minutes after the emulsion had been added, stirring was interrupted and the cellulose pearls and precipitated ammonium bensoat were permitted to sediment over night. The remaining liquid was then removed by suction and the sediment was slurried in a solution of 120 g. of sodium hydroxide in 3 l. of water by agitation, until all the sodium bensoat had passed into solution. The cellulose pearls were then allowed to settle for approximately 3 hours, whereafter the then remaining liquid was removed by suction, washed with running water on a screen cloth having a mesh width of 0.040 mm. The pearls were then treated with 300 ml. of 50 percent acetic acid for the purpose of removing copper salt rests, whereafter they were rewashed on the same screen cloth with water. The pearls were simultaneously passed through a screen cloth having a mesh width of 0.25 mm., for the purpose of separating coarse material.

The cellulose pearls obtained in accordance with the aforegoing were drained on a filter, whereafter 150 g. of pearls were mixed with 135 ml. of water containing 10 g. of dextran with the limiting viscosity number 1.1 dl./g., and 7.5 g. of sodium hydroxide The mixture was suspended in 600 ml. of 1,2-dichloroethane, wherein 45 g. of cellulose acetate butyrate had been dissolved while stirring at 300 r.p.m. with an agitator in a cylindrical reaction vessel. Fifteen ml. of epichlorohydrin were then added. The reaction was allowed to proceed at 50° C. for 16 hours. 700 ml. of ethyl acetate were then added and, subsequent to sedimentation of the cellulose-containing pearls, the pearls were slurried five times in 300 ml. of ethyl acetate. The pearls were then treated with 300 ml. of 1 M sodium hydroxide solution, for hydrolizing remaining acetate and butyrate groups. The product was then washed with running water on a screen cloth having a mesh width of 0.040 mm., treated with 300 ml. of 50 percent acetic acid and rewashed on the screen cloth with water. Subsequent to sedimentation of the product in a measuring glass, a yield of 87 ml. was read off. The product has an exclusion limit for dextran of approximately 100,000.

EXAMPLE 2

Cellulose pearls obtained in accordance with example 1 but with twice the quantity of cellulose were drained on a filter, whereafter 210 g. of said pearls were mixed with a solution of 12 g. of dextran having the limiting viscosity number 0.40 dl./g., and 8 g. of sodium hydroxide in 200 ml. of water. The mixture was suspended in 800 ml. of 1,2-dichloroethane, in which 60 g. of cellulose-acetate butyrate had been dissolved. 120 ml. of glycerol-bis-epoxy-propyl ether (technical quality, Epicots 812 from Shell Chemicals) were then added. The reaction was continued at 50° C. for 16 hours. 1,000 ml. of ethyl acetate were then added and, subsequent to sedimentation, the product was slurried five times in 5,000 ml. of ethylacetate. The product was then treated with 500 ml. of 1 M sodium hydroxide solution, washed on a screen cloth with running water, treated with 500 ml. of 50 percent acetic acid and then washed on the screen cloth with running water. 185 ml. of a product having an exclusion limit for dextran of 350,000 were obtained.

EXAMPLE 3

Two hundred and ten grams of drained cellulose pearls prepared in accordance with example 1 were mixed with a solution of 20 g. of dextran, having a limiting viscosity number of 1.1 dl./g., and 8 g. of sodium hydroxide in 200 ml. of water. The mixture was suspended in 800 ml. of 1,2-dichloroethane containing 60 g. of cellulose acetate butyrate. 24 ml. of 1,4-butandiol-bis-epoxypropyl ether were then added. The reaction was continued at 50° C. for 16 hours. Subsequent to working up the product in accordance with example 2, 96 ml. of product were obtained with an exclusion limit for dextran of approximately 1 million.

EXAMPLE 4

One hundred and forty milliliters of a product having an exclusion limit for dextran of approximately 1 million were obtained in a manner similar to that described in example 3 from 20 g. of polyvinyl alcohol with a viscosity of 4 cps. (4 percent solution at 20° C.) and with a degree of hydrolysis of 89 percent.

EXAMPLE 5

One hundred and thirty-five milliliters of a product having an exclusion limit for dextran of approximately 50,000 were obtained in a manner similar to that described in example 3 from 20 g. of hydroxyethylcellulose (Cellosize WP-09 from Union Carbide, U.S.A.).

EXAMPLE 6

One hundred and ten milliliters of a product having an exclusion limit for dextran of approximately 3 million were obtained in a manner similar to that described in example 3 from 20 g. of dextrin (white merchandise).

EXAMPLE 7

Two hundred millimeters of a product having an exclusion limit for dextran of approximately 10,000 were obtained in a manner similar to that described in example 5 from 80 g. of a copolymer of sucrose and epichlorohydrin, having the limiting viscosity number of 0.17 dl./g.

EXAMPLE 8

One hundred milliliters of cellulose pearls obtained in accordance with example 1 were mixed with a solution of 14 g. of dextran, having the limiting viscosity number 1.1 dl./g., and 5 g. of sodium hydroxide in 81 ml. of water. The mixture was suspended in 600 ml. of toluene, in which had been dissolved 24 g. of sorbitanlaurate (Span 20 from Atlas Chem. Ind., U.S.A.) and 24 g. of polyoxyethylene-sorbitanlaurate (Tween 20 from Atlas Chem. Ind., U.S.A.) 10 ml. of epichlorohydrin were then added. The reaction was continued at 50° C. for 16 hours. Subsequent to washing with running water on a screen cloth, 102 ml. of a product having an exclusion limit for dextran of approximately 100,000 was obtained.

For the purpose of verifying the good flow properties of the products obtained in accordance with the invention one such product was subjected to a flow test. This product was prepared in accordance with example 2, although starting from cellulose pearls prepared in accordance with example 1. The product was slurried in water and packed to form a bed having a diameter of 2.5 cm. A hydrostatic pressure drop($p$) was then progressively applied over the bed, whereupon the linear flow (U) and the bed height (L) were measured at each value on $p$.

The result of the flow test is shown in the accompanying drawing, FIG. 2, which shows U in cm./hour as a function of $p/L$ for the product prepared according to example 2 (upper curve) in comparison with a similar, nonreinforced product (lower curve) known in the art (Sephadex$^{(R)}$ G-200 from Pharmacia Fine Chemicals AB, Uppsala, Sweden, having an exclusion limit of approximately 200,000). Since the grains of this product were somewhat coarser than those of the products of the invention, the latter having an average grain size of 0.140 mm., the flow data of said product was corrected in respect thereof, it being known that the flow is proportional to the square of the average grain size. It is evident from FIG.

2 that a product produced in accordance with the invention presents considerably better flow properties than nonreinforced gels of a similar type. The differences are still greater in beds of larger diameter, since the supporting effect of the column walls is then less.

The substantial gain in flow properties obtained by means of the present invention can in principle be utilized in two different ways. The first is to take out the gain direct as an increased flow with subsequent increase in capacity. The other is to utilize the gain in a reduced grain size and retain the flow on a relatively low level. A reduced grain size increases the ability of the bed to separate closely related substances. For a given flow, the size of the grains of the present invention can be selected considerably lower than grains known to the art. Arbitrary combinations of these extremities are of course conceivable. The first mentioned method, however, should be considered in the case of very large beds, while the second method can be considered in the case of relatively large beds.

What we claim is:

1. A separation medium for gel filtration, consisting essentially of grains of a water-insoluble copolymer of at least one hydroxyl-group-containing substance with a bifunctional substance of the formula X-R-Z, wherein X and Z are halogen or an epoxy group and R is an aliphatic group containing 3—10 carbon atoms, the separation medium having an exclusion limit for globular proteins and viruses within the molecular weight range of from 10,000 to 10 million, characterized in that the grains are reinforced with a rigid, hydrophilic, macroporous material.

2. A separation medium as claimed in claim 1, wherein the copolymer has an exclusion limit for globular proteins and viruses in the molecular weight range of from 50,000 to 2 million.

3. A separation medium as claimed in claim 1, wherein the rigid, hydrophilic, macroporous material constitutes pearls of regenerated cellulose having a bulk density of 2—25 g./dl., the cellulose having a pore size in the range of from 2 to 2,000 $\mu$.

4. A process of preparing a separation medium in accordance with claim 1, characterized by copolymerizing in the pores of a rigid hydrophilic, macroporous, granular material a hydroxyl-group-containing substance with a bifunctional substance of the formula X-R-Z, wherein X and Z are each halogen or an epoxy group and R is an aliphatic group containing 3—10 carbon atoms in an aqueous solution, the proportions of the hydroxyl-group-containing substance and bifunctional substance being selected so that the resulting copolymer is insoluble in water and obtains an exclusion limit for globular proteins and viruses in the molecular weight range of from 10,000 to 10 million.

5. A process as claimed in claim 4, wherein the rigid, hydrophilic, macroporous, granular material constitutes pearls of regenerated cellulose of a bulk density of 2—25 g./d/., the grains having a pore size in the range of from 2 to 2,000 $\mu$.

6. A process as claimed in claim 4, wherein the content of the hydroxyl-group-containing substance in the aqueous starting solution used in the polymerization process amounts to 2—20 g./dl.

7. A process as claimed in claim 5, wherein the content of the hydroxyl-group-containing substance in the aqueous starting solution used in the polymerization process amounts to 2—20 g./dl.

8. A separation medium as claimed in claim 2 wherein the rigid hydrophilic, macroporous material constitutes pearls of regenerated cellulose having a bulk density of 2—25 g./dl., the cellulose having a pore size in the range of from 2 to 2,000 $\mu$.

9. The process of claim 4 wherein the copolymer has an exclusion limit for globular proteins and viruses in the molecular weight range of from 50,000 to 2 million.

10. The process of claim 5 wherein the copolymer has an exclusion limit for globular protein and viruses in the molecular weight range of from 50,000 to 2 million.